United States Patent
Sennett et al.

(10) Patent No.: US 9,002,318 B2
(45) Date of Patent: *Apr. 7, 2015

(54) DETERMINATION OF NON-VOICE EMERGENCY SERVICE AVAILABILITY

(71) Applicants: AT&T Intellectual Property I, L.P., Atlanta, GA (US); AT&T Mobility II LLC, Atlanta, GA (US)

(72) Inventors: DeWayne Sennett, Redmond, WA (US); Brian Daly, Peachtree Corners, GA (US); Charles Musgrove, Henderson, NV (US); George Stanek, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,413

(22) Filed: Jun. 27, 2013

(65) Prior Publication Data

US 2013/0288635 A1 Oct. 31, 2013

Related U.S. Application Data

(62) Division of application No. 13/114,742, filed on May 24, 2011, now Pat. No. 8,503,975.

(51) Int. Cl.
*H04M 11/04* (2006.01)
*H04W 4/22* (2009.01)
*H04W 76/00* (2009.01)

(52) U.S. Cl.
CPC ............. *H04W 4/22* (2013.01); *H04M 2242/04* (2013.01); *H04W 76/007* (2013.01)

(58) Field of Classification Search
CPC .............. H04W 76/007; H04W 4/245; H04M 1/72519; H04M 2242/04; G08B 25/016
USPC ............. 455/404.1, 550, 550.1, 418; 379/45; 340/539.18

See application file for complete search history.

(56) References Cited

U.S. PATENT DOCUMENTS

| | | | |
|---|---|---|---|
| 7,215,282 B2 | 5/2007 | Boling et al. | |
| 2008/0081646 A1* | 4/2008 | Morin et al. | 455/466 |
| 2009/0168974 A1 | 7/2009 | Mc Cormick | |
| 2011/0065416 A1 | 3/2011 | Burt et al. | |
| 2011/0086607 A1* | 4/2011 | Wang et al. | 455/404.1 |
| 2011/0188416 A1* | 8/2011 | Faccin et al. | 370/310 |
| 2012/0302217 A1 | 11/2012 | Sennett et al. | |
| 2013/0109344 A1* | 5/2013 | Ung | 455/404.2 |
| 2013/0252649 A1* | 9/2013 | Siomina et al. | 455/466 |

* cited by examiner

*Primary Examiner* — Danh Le
(74) *Attorney, Agent, or Firm* — Baker & Hostetler LLP

(57) ABSTRACT

Determining if non-voice emergency services (NOVES) are available is accomplished via an indicator provided via a control channel and/or via a query to a network entity. For example, a NOVES indicator can be provided, via a control channel message, to a communications device, indicating whether non-voice emergency services (NOVES) are available or not available. Additionally, capabilities of public safety answering points (PSAPs) providing NOVES can be included. For example, the indicator can include information as to whether an identified PSAP can receive a text based emergency message, an emergency message comprising a image, and emergency message comprising audio, and/or an emergency message comprising video. In another example configuration, a communications device can query a communications network to determine the availability of NOVES and PSAP capabilities. A response to the query can include an indication as to whether non-voice services are available, and, if appropriate, the types of NOVES services available.

12 Claims, 11 Drawing Sheets

DETERMINATION OF NON-VOICE EMERGENCY SERVICE AVAILABILITY

CROSS REFERENCE TO RELATED APPLICATIONS

The instant application is a divisional application of, and claims priority to, U.S. patent application Ser. No. 13/114,742, filed May 24, 2011. U.S. patent application Ser. No. 13/114,742 is incorporated herein by reference in its entirety.

TECHNICAL FIELD

The technical field generally relates to public safety, and more specifically relates to determining if non-voice emergency services (NOVES) are available.

BACKGROUND

A non-voice emergency service (NOVES) can provide users thereof the ability to send a non-voice emergency message to an emergency services center, such as a 911 call center. However, not all emergency service centers are equipped to handle non-voice emergency messages.

SUMMARY

Methods and systems are described herein for determining if non-voice emergency services (NOVES) are available. In an example embodiment, a NOVES indicator is included in a control channel message provided to a communications device. The NOVES indicator can indicate if NOVES are available or if NOVES are not available. When NOVES are available, the NOVES indicator also can indicate the types of NOVES services available, such as images, video, text, audio, etc. That is, for example, indicate whether the types of NOVES service include an emergency message can include a text based emergency message, an emergency message comprising a image, an emergency message comprising audio, and/or an emergency message comprising video. In another example embodiment, a mobile communications device can query a communications network to determine the availability of NOVES capabilities. A response to the query can include an indication as to whether non-voice services are available. The response to the query also could include information pertaining to the types of NOVES services available, such as images, video, text, audio, etc.

DETAILED DESCRIPTION OF ILLUSTRATIVE EMBODIMENTS

As described herein, determining if non-voice emergency services (NOVES) are available or not can be accomplished via various mechanisms. In one example embodiment, a NOVES indicator can be provided to a communications device, indicating whether non-voice emergency services (NOVES) are available or not available. The NOVES indicator can be provided via an appropriate mechanism to the communications device. For example, the NOVES indicator can be sent to a communications device via a control channel message. The NOVES indicator can comprise a bit or bits indicating whether NOVES are available. The NOVES could be indicative of NOVES availability on a cell site basis. The availability of NOVES on a cell site basis can be predefined in coordination with a public safety answering point (PSAP) that is handling the area covered by the cell site. If all PSAPs within the coverage area of the cell site support NOVES, the NOVES indicator could be set to indicate that NOVES are available. If none of the PSAPs within the coverage area of the cell site support NOVES, the NOVES indicator could be set to indicate that NOVES are not available. For example, the NOVES indicator could be contained on the LTE Broadcast Control Channel (BCCH), the LTE Common Control Channel (CCCH), or the LTE Dedicated Control Channel (DCCH). The mobile device can monitor these control channels to also receive instructions on connection to the LTE radio access network. The NOVES indicator can be maintained in the RAN configuration information within the eNodeB.

Figure 1:
FIG. 1 depicts an example indication of NOVES being available.
Figure 2:
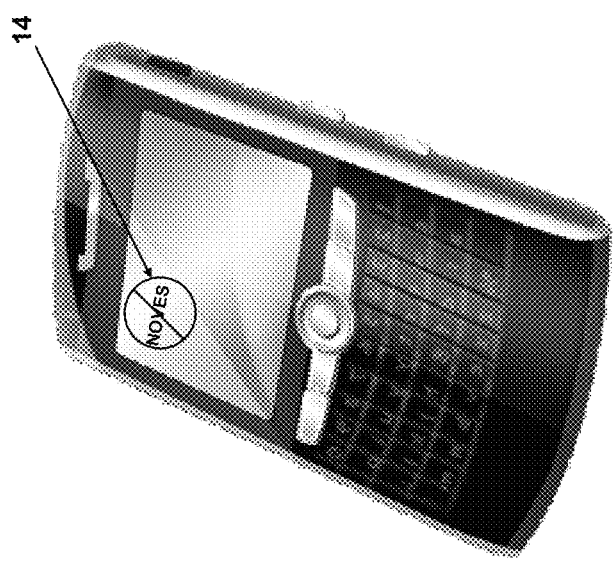
FIG. 2 depicts an example indication of NOVES not being available.

In an example embodiment, the communications device could interpret the NOVES indicator, and render an indication as to the availability of NOVES. The indication of availability of NOVES could be rendered in any appropriate manner. For example, as depicted in FIG. 1, the communications device could display an icon 12, or the like, indicating that NOVES are available. As depicted in FIG. 2, the communications device could display an icon 14, or the like, indicating that NOVES are not available. In various example embodiments, the indication of availability of NOVES could be rendered via sound and/or mechanically (e.g., vibration). In another example embodiment, an icon, such as icon 12, could indicate that NOVES are available, and the lack of an icon could indicate that NOVES are not available. When a user of a communications device attempts to send a non-voice emergency message, the communications device could check the status of the NOVES indicator bit, and could immediately inform the user of the availability or lack of availability of NOVES capabilities.

In an example configuration, responsive to receipt of the NOVES indicator, the communications device can store the NOVES indicator (in memory in the communications device for example), or any appropriate indication of NOVES availability obtained from the NOVES indicator. The stored information pertaining to NOVES availability can be accessed to provide the rendered indications described above. When the communication device receives another NOVES indicator, the updated NOVES indicator, or an appropriate indication of NOVES availability obtained from the updated NOVES indicator can be stored in the communications device.

Figure 3:
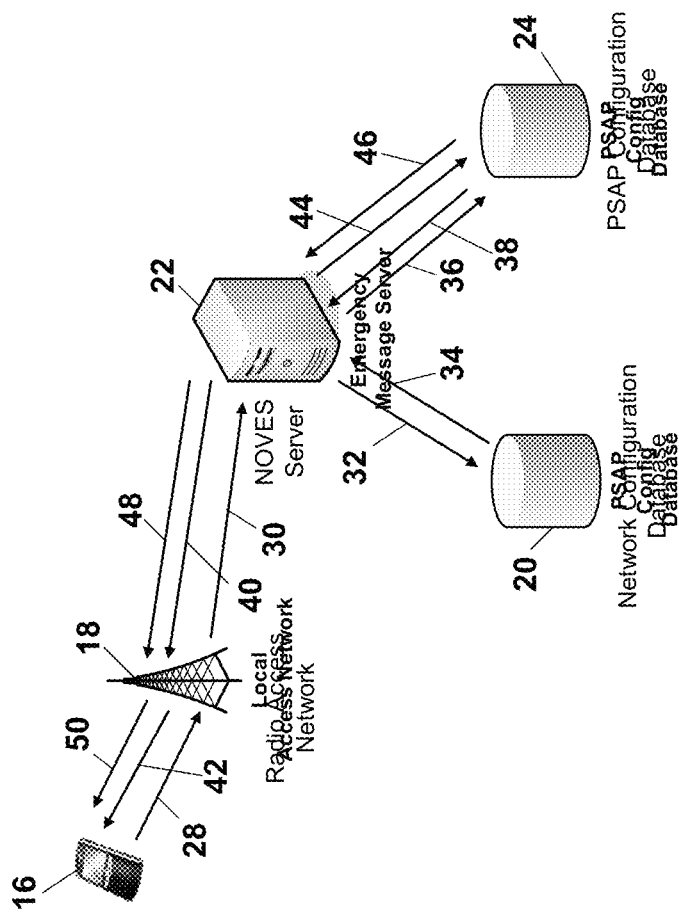
FIG. 3 illustrates an example system and process for determining if non-voice emergency services are available.

FIG. 3 illustrates an example system and process for determining if non-voice emergency services are available. A communications device 16 may have an application or the like, installed on the communications device 16, to determine if NOVES are available. When this NOVES application is initiated, the communications device 16 may initiate and send a query, at steps 28 and 30, to a NOVES server 22 via a wireless network 18, to determine if NOVES are available. As described herein, the NOVES capabilities are received from the PSAP and this information is provisioned in the eNodeB. However, for this example configuration, the NOVES information is stored on a PSAP configuration database associated with a NOVES server. This PSAP configuration information could identify the PSAP and its associated PSAP boundaries could also identify its NOVES capability. The NOVES Server could utilize the PSAP configuration database in conjunction with the Network configuration database to (1) determine which PSAP provides coverage for the mobile device's current location and (2) to determine whether or not that PSAP is NOVES capable. In an example configuration, the communications device 16 may be capable of supporting a NOVES address via a messaging service, such as instant messaging, or the like. When the communications device 16 detects that a NOVES address has been entered, the communications device 16 could initiate and send a query, at steps 28 and 30, to a NOVES server 22 via a wireless network 18, to determine if NOVES are available.

The query can comprise any appropriate information to determine if NOVES are available. For example, the query can comprise information indicative of a cellular site handling the region in which the communications device is located. The query could comprise information indicative of the location of the communications device 16, such as, for example, a location determined by the Global Positioning System (GPS), assisted GPS (A-GPS), time difference of arrival calculations, configured constant location (in the case of non-moving devices), or any combination thereof.

In an example embodiment, if the query contains information pertaining to the cellular site handling the region in which the communications device 16 is located (e.g., Cell Site ID), the NOVES 22 server can query a network configuration database 20, at step 32, to retrieve coverage information about the indicated cell site. At step 34, the network configuration database provides a response to the query. The coverage information provided in the query response (at step 34) can include any appropriate information. Examples of the information returned could be the location of the associated cell site and/or the estimated coverage area of that cell site. Estimated cell site coverage area information could be used to identify the one or more PSAPs which provide service within the cell site estimated coverage area. Using the retrieved cell site coverage information (the information contained in the query response), the NOVES server 22 can query a public safety answering point (PSAP) configuration database 24, at step 36, to identify which PSAP's boundaries are within the coverage area of the cell site. The NOVES server 22 also, can query the PSAP configuration database 24, at step 36, to determine NOVES capabilities of the identified PSAPs. At step 38, the PSAP configuration database 24 can provide a response to the query received at step 36. In various example embodiments, the query response provided at step 38 can include identified PSAPs that handle the region in which the communications device is located, and additionally can include NOVES capabilities of each identified PSAP (e.g., video, text, audio, etc.) This information could indicate the codec and format encoding types for the multimedia formats such as video, graphics, pictures, and audio.

Upon receiving the query response at step 38, the NOVES server 22 processes the information contained in the query response (received at step 38) to determine if a PSAP or PSAPs covering the region in which the communications device 16 is located supports NOVES. All PSAPs in coverage area support NOVES. At steps 40 and 42, the NOVES server 22 provides, via the radio access network 18, an indication as to whether a PSAP or PSAPs in the coverage area support NOVES. In an example embodiment, the indication provided at steps 40 and 42 comprises an indication that no PSAP in the coverage supports NOVES. In another example embodiment, the indication provided at steps 40 and 42 comprises an indication that every PSAP in the coverage supports NOVES. In another example embodiment, the indication provided at steps 40 and 42 comprises an indication that no PSAP in the coverage supports NOVES. In another example embodiment, the indication provided at steps 40 and 42 comprises an indication of the respective capabilities (video, text, audio, etc.) of each PSAP in the coverage that supports NOVES.

If the query provided at steps 28 and 30 comprises a location of the communications device 16, in an example embodiment, the NOVES server 22 can query the PSAP configuration database 24, at step 44, to identify which PSAP's boundaries cover the location of the communications device 16. The Network Configuration Database contains information such as the location for cell site (e.g., latitude & longitude), the number of sectors supported, the orientation of these sectors, and the power levels of these sectors. The NOVES server 22 also, can query the PSAP configuration database 24, at step 44, to determine NOVES capabilities of the identified PSAPs. The PSAP configuration database contains information such as the physical address of the PSAP, the telecommunications address of the PSAP (e.g., telephone numbers, IP addresses), the coverage area of the PSAP (e.g., polygon defined via a set of latitudes & longitudes), and NOVES capabilities including types and formats of multimedia communications supported. At step 46, the PSAP configuration database 24 can provide a response to the query received at step 44. In various example embodiments, the query response provided at step 46 can include a identified PSAPs that handle the region in which the communications device is located, and additionally can include NOVES capabilities of each identified PSAP (e.g., video, text, audio, etc.) This information could indicate the codec and format encoding types for the multimedia formats such as video, graphics, pictures, and audio.

Upon receiving the query response at step 46, the NOVES server 22 processes the information contained in the query response (received at step 46) to determine if a PSAP or PSAPs covering the region in which the communications device 16 is located supports NOVES. All PSAPs in coverage area support NOVES. At steps 48 and 50, the NOVES server 22 provides, via the radio access network 18, an indication as to whether a PSAP or PSAPs in the coverage area support NOVES. In an example embodiment, the indication provided at steps 48 and 50 comprises an indication that no PSAP in the coverage supports NOVES. In another example embodiment, the indication provided at steps 48 and 50 comprises an indication that every PSAP in the coverage supports NOVES. In another example embodiment, the indication provided at steps 48 and 50 comprises an indication that no PSAP in the coverage supports NOVES. In another example embodiment, the indication provided at steps 48 and 50 comprises an indication of the respective capabilities (video, text, audio, etc.) of each PSAP in the coverage that supports NOVES.

Upon receipt of the query response at step 42 or 50, the communications device can take appropriate action. In an example embodiment, if the query response, received via step 42 or 50, comprises an indication that no identified PSAP supports NOVES, the communications device 16 can provide an indication, via a display, audio, and/or mechanical vibration, for example, that a voice based call should be initiated, provide an indication that no identified PSAP supports NOVES, or a combination thereof. In another example embodiment, if the query response, received via step 42 or 50, comprises an indication that an identified PSAP, or identified PSAPs, supports NOVES, the communications device 16, can initiate a non-voice based message. In another example embodiment, the query response, received via step 42 or 50, can comprise an indication that an identified PSAP supports NOVES and the types of NOVES supported. For example, the response could include an indication as to whether an identified PSAP can receive a text based emergency message, an emergency message comprising a image, and emergency message comprising audio, an emergency message comprising video, or any combination thereof. If the query response, received via step 42 or 50, comprises an indication that an identified PSAP supports NOVES and the types of NOVES supported, the communications device 16 can provide an indication, via a display, audio, and/or mechanical vibration, for example, of the types of NOVES supported, can allow a user to select the type of NOVES to initiate, and can initiate a non-voice call in accordance with the type selected.

Figure 4:
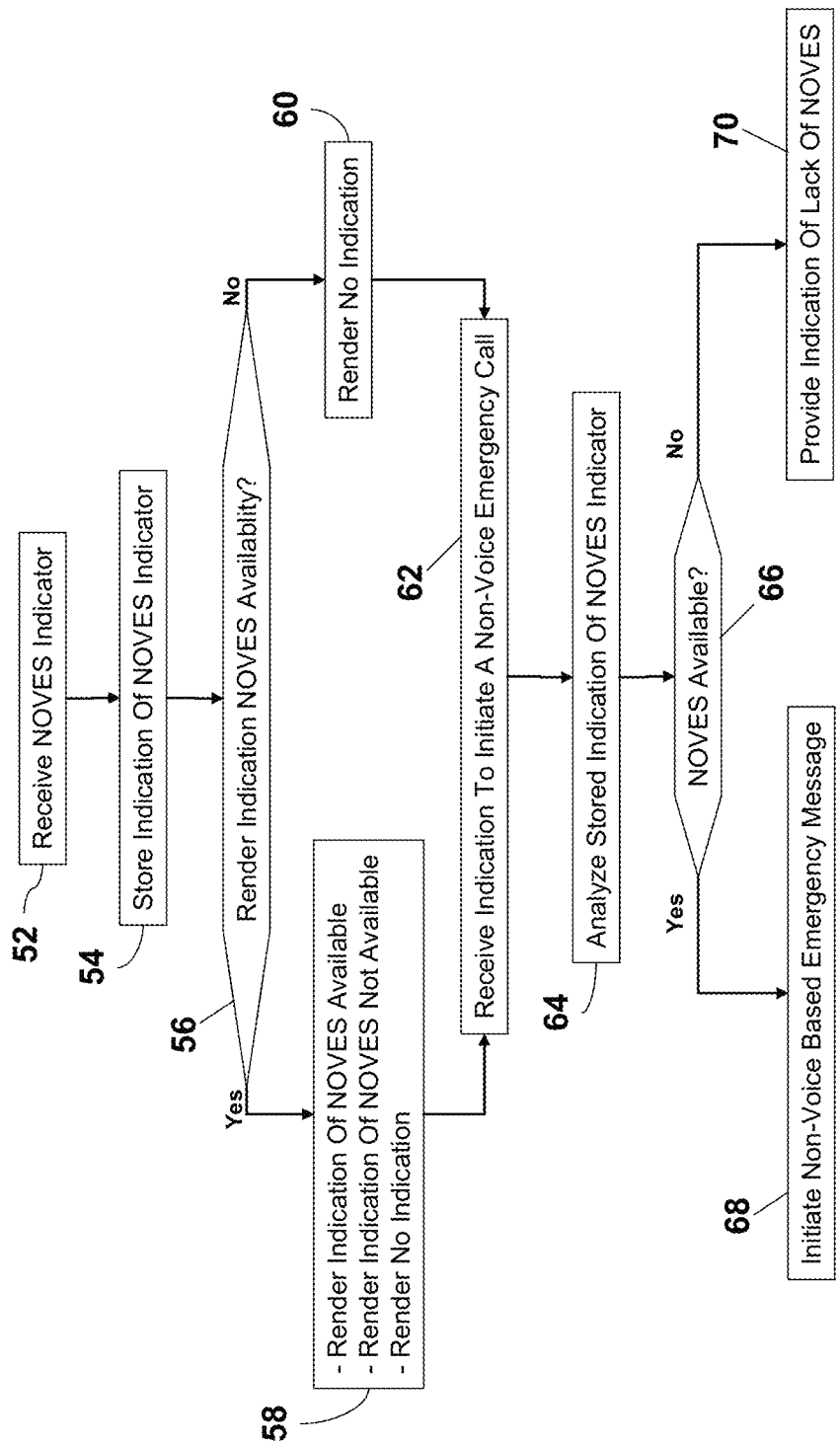
FIG. 4 is a flow diagram of an example process for determining NOVES availability via an indicator.

FIG. 4 is a flow diagram of an example process for determining NOVES availability via an indicator. At step 52, a NOVES indicator is received, by a communications device for example. The NOVES indicator indicates whether NOVES are available or not available. The NOVES indicator can be received via an appropriate mechanism. For example, the NOVES indicator can be sent to a communications device via a control channel message. The NOVES indicator can comprise a bit or bits indicating whether NOVES are available. The NOVES could be indicative of NOVES availability on a cell site basis. The available of NOVES on a cell site basis can be predefined in coordination with a PSAP that is handling the area covered by the cell site. If all PSAPs within the coverage area of the cell site support NOVES, the NOVES indicator could be set to indicate that NOVES are available. If none of the PSAPs within the coverage area of the cell site support NOVES, the NOVES indicator could be set to indicate that NOVES are not available. If some of the PSAPs identified as covering the area, support NOVES, the NOVES indicator could include information indicating which identified PSAPs support NOVES.

An indication of the NOVES indicator is stored at step 54. In an example configuration, responsive to receipt of the NOVES indicator, the communications device can store the NOVES indicator, or any appropriate indication of NOVES availability obtained from the NOVES indicator. Storage can include memory in the communications device, or external storage (external to the communications device), for example.

At step 56 it is determined if an indication of NOVES availability is to be rendered. The stored information pertaining to NOVES availability can be accessed to provide the rendered indication of NOVES availability. If it is determined, at step 56, that the indication of NOVES availability is to be rendered, the indication of NOVES v is rendered at step 58. The indication of the NOVES availability can be rendered in any appropriate manner, such as, for example, visually, audibly, and/or mechanically (vibration). In an example configuration, if NOVES are available, a visual indication can be rendered, such as, for example, as depicted in FIG. 1. In an example embodiment, if NOVES are not available, a visual indication can be rendered, such as, for example, as depicted in FIG. 2. In an example embodiment, if NOVES are not available, no indication is rendered. Thus, the lack of an indication (icon, beep, vibration, etc.) could indicate that NOVES are not available.

When the communication device receives another NOVES indicator, the updated NOVES indicator, or an appropriate indication of NOVES availability obtained from the updated NOVES indicator can be stored in the communications device and rendered if appropriate.

An indication to initiate a non-voice emergency call is received at step 62. Responsive to receiving the indication to initiate the non-voice emergency call, the stored indication of the NOVES indicate is analyzed at step 64. At step 66 it is determined if NOVES are available. If, at step 66, it is determined that NOVES are available, the non-voice based call is initiated at step 68. If, at step 66, it is determined that NOVES are not available, an indication is provided, at step 70, the NOVES are not available. Along with the indication of lack of NOVES, provided at step 70, a message or the like, could be provided instructions to initiate a voice based emergency call.

Figure 5:
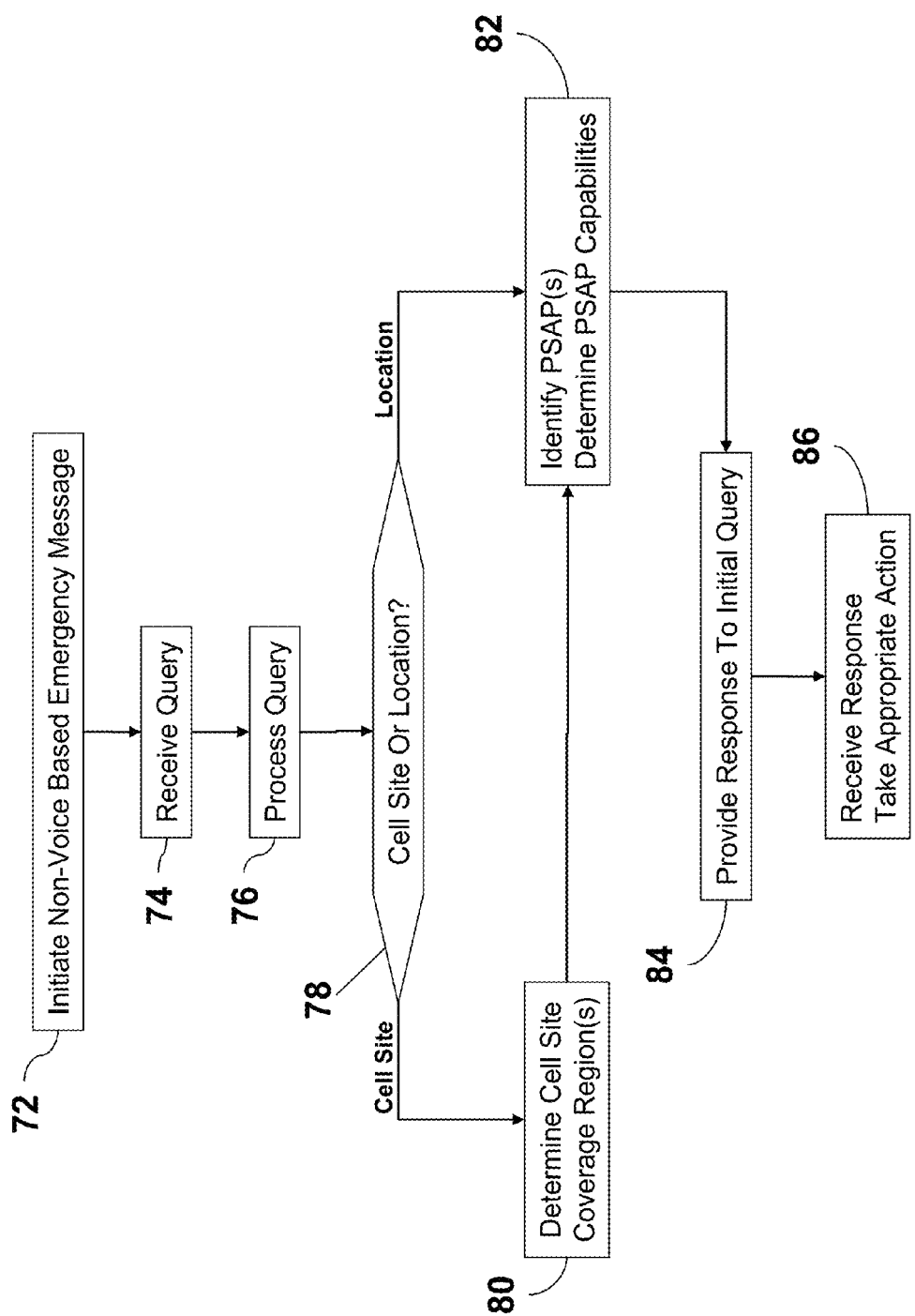
FIG. 5 is a flow diagram of an example process for determining NOVES availability via a query.

FIG. 5 is a flow diagram of an example process for determining NOVES availability via a query. A non-voice based emergency message is initiated at step 72. The non-voice based emergency message can be initiated by any appropriate device, such as, for example, a communications device (e.g., communications device 16). The communications device may initiate and send a query to determine if NOVES are available. The query is received at step 74. In an example configuration, the communications device may be capable of supporting a NOVES address via a messaging service, such as instant messaging, or the like. When the communications device detects that a NOVES address has been entered, the communications device could initiate and send a query to determine if NOVES are available.

The query can be received by any appropriate entity. For example, the query could be received by a network entity, such as a NOVES server (e.g., NOVES server 22), or the like. The query can comprise any appropriate information to determine if NOVES are available. For example, the query can comprise information indicative of a cellular site handling the region in which the communications device that provided the query is located. The query could comprise information indicative of the location of the communications device that provided the query, such as, for example, a location determined by the Global Positioning System (GPS), assisted GPS (A-GPS), time difference of arrival calculations, configured constant location (in the case of non-moving devices), or any combination thereof.

The query is processed at step 76. In an example embodiment, the query is processed, at least in part, to determine if information contained in the query pertains to cell site coverage or a location from which the query was provided. That is, in an example embodiment, the query is processed to determine if the query contains information about the cellular site, or sites, that provides coverage to the region from which the query was provided, or if the query contains information about the location (e.g., GPS coordinates, or the like) from which the query was provided. At step 78, it is determined if the query contains information pertaining to a cellular site, or sites, or a location of from which the query was provided. If it is determined, at step 78, that the query contains information (e.g., cell site identifiers, IDs,) pertaining to the cellular site(s) handling the region in from which the query was provided, the region, or regions, covered by the cell sites are determined at step 80. In an example embodiment for example, a network database can be queried. The network database can comprise any appropriate entity, such as, for example, network configuration database 20. The network database can provided a response to the query including information pertaining to the region, or regions, that are covered by the cell site(s). At step 82, the PSAP, or PSAPs, that are assigned to handle the region, or regions, covered by the cell site(s) are identified. Additionally, at step 82, NOVES capabilities of each identified PSAP can be determined. In an example embodiment, for example, a PSAP database is queried. The PSAP database can comprise any appropriate entity, such as, for example, PSAP configuration database 24.

If it is determined, at step 78, that the query contains information pertaining the location from which the query was provided, the process proceeds to step 82, wherein the PSAP, or PSAPs, that are assigned to handle the location are identified. Additionally, at step 82, NOVES capabilities of each identified PSAP can be determined. For example, it can be determined if an identified PSAP can receive a text based emergency message, an emergency message comprising a image, and emergency message comprising audio, an emergency message comprising video, or any combination thereof.

A response to the initial query (received at step 74) is provided at step 84. The response can comprise any appropriate information pertaining to NOVES availability. In an example embodiment, the response comprises an indication that no identified PSAP supports NOVES. The response can comprise an indication that an identified PSAP, or identified PSAPs, supports NOVES. In another example embodiment, if the query response comprises an indication that an identified PSAP supports NOVES and the types of NOVES (image, video, text, audio, etc.) supported by each PSAP.

At step 86, the device that initiated the non-voice based message (at step 72) receives the response and takes appropriate action. If, for example, the response comprises an indication that no identified PSAP supports NOVES, the device can provide an indication, via a display, audio, and/or mechanical vibration, for example, that a voice based call should be initiated, provide an indication that no identified PSAP supports NOVES, or a combination thereof. If the response comprises an indication that an identified PSAP, or identified PSAPs, supports NOVES, the device can initiate a non-voice based message. If the response comprises an indication that an identified PSAP supports NOVES and the types of NOVES supported, the device can provide an indication, via a display, audio, and/or mechanical vibration, for example, of the types of NOVES supported, can allow a user of the device to select the type of NOVES to initiate, and can initiate a non-voice call in accordance with the type selected. For example, if available, the user could select to send a text based emergency message, an emergency message comprising a image, and emergency message comprising audio, an emergency message comprising video, or any appropriate combination thereof.

Figure 6:
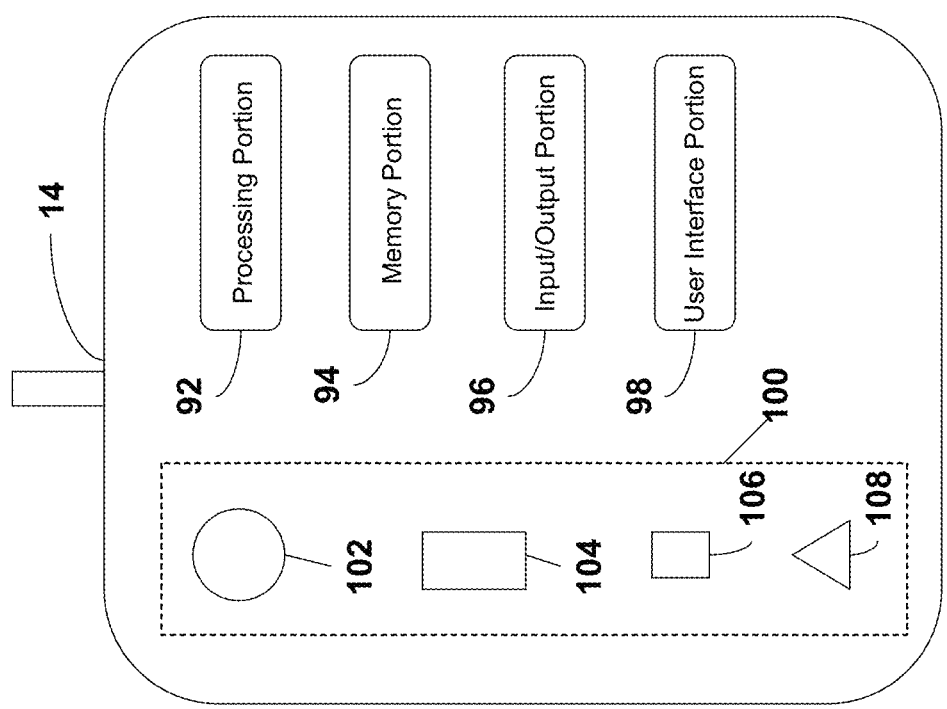
FIG. 6 is a block diagram of an example wireless communications device that is configurable to determine if non-voice emergency services are available.

FIG. 6 is a block diagram of an example wireless communications device 14 that is configurable to determine if non-voice emergency services are available. The communications device 14 can include any appropriate device, mechanism, software, and/or hardware for determining if non-voice emergency services are available as described herein. As described herein, the communications device 14 comprises hardware, or a combination of hardware and software. And, each portion of the communications device 14 comprises hardware, or a combination of hardware and software. In an example configuration, the communications device 14 comprises a processing portion 92, a memory portion 94, an input/output portion 96, a user interface (UI) portion 98, and a sensor portion 100 comprising at least one of a video camera portion 102, a force/wave sensor 104, a microphone 106, a moisture sensor 108, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 108 is capable of detecting moisture, such as detecting if the communications device 14 is submerged in a liquid. The processing portion 92, memory portion 94, input/output portion 96, user interface (UI) portion 98, video camera portion 102, force/wave sensor 104, and microphone 106 are coupled together to allow communications therebetween (coupling not shown in FIG. 6). The communications device 14 also can comprise a timer (not depicted in FIG. 6).

In various embodiments, the input/output portion 96 comprises a receiver of the communications device 14, a transmitter of the communications device 14, or a combination thereof. The input/output portion 96 is capable of receiving and/or providing information pertaining to determining if non-voice emergency services are available as described herein. The input/output portion 96 also is capable of communications with the local access network 18 and/or the NOVES server 22, as described herein. For example, the input/output portion 96 can include a wireless communications (e.g., 2.5G/3G/GPS) SIM card. The input/output portion 96 is capable of receiving and/or sending text information, video information, audio information, control information, image information, data, or any combination thereof. In an example embodiment, the input/output portion 96 is capable of receiving and/or sending information to determine a location of the communications device 14. In an example configuration, the input\output portion 96 comprises a GPS receiver. In an example configuration, the communications device 14 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 96 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 92 is capable of determining if non-voice emergency services are available as described herein. For example, the processing portion 92 is capable of, in conjunction with any other portion of the communications device 14, executing an application for facilitating provision of a non-voice emergency message, analyzing a NOVES indicator, analyzing a stored indication of a NOVES indicator, initiating a non-voice based emergency message, generating a query, analyzing a query response, generating a text message, generating a voice message, processing a received text message, processing a received voice message, retrieving a predetermined message, processing text messages provided via the user interface portion 98, processing voice messages provided via the user interface portion 98, processing text messages received via the input/output portion 96, processing voice messages received via the input/output portion 96, or the like, or any combination thereof. The processing portion 92, in conjunction with any other portion of the communications device 14, can provide the ability for users/subscribers to enable, disable, and configure various features of an application for determining if non-voice emergency services are available, as described herein. For example, a user, subscriber, parent, healthcare provider, law enforcement agent, of the like, can define configuration parameters such as, for example, an emergency contact list, voice/text/image/video options for an emergency call, threshold settings (e.g., timer settings, signature settings, etc.), to be utilized when sending and/or receiving a text/voice message to/from an emergency call taker. The processing portion 92, in conjunction with any other portion of the communications device 14, enables the communications device 14 to covert speech to text when it is configured to send text messages while facilitating a 911 voice call from a non-voice message. In an example embodiment, the processing portion 92, in conjunction with any other portion of the communications device 14 as needed, can convert text to speech for rendering via the user interface portion 98.

In a basic configuration, the communications device 14 can include at least one memory portion 94. The memory portion 94 can store any information utilized in conjunction with determining if non-voice emergency services are available s described herein. For example, the memory portion 94 is capable of storing information pertaining to a NOVES indicator, an indication of a NOVES indicator, an indication (icon, etc.) that NOVES are available, an indication (icon, etc.) that NOVES are not available, an indication of an identified PSAP, an indication of a PSAP, an indication of a capability of a PSAP, a location of a communications device, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of processor, the memory portion 94 can be volatile (such as some types of RAM), non-volatile (such as ROM, flash memory, etc.). The communications device 14 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 94, or a portion of the memory portion 92 is hardened such that information stored therein can be recovered if the communications device 14 is exposed to extreme heat, extreme vibration, extreme moisture, corrosive chemicals or gas, or the like. In an example configuration, the information stored in the hardened portion of the memory portion 94 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 94 intelligible.

The communications device 14 also can contain a UI portion 98 allowing a user to communicate with the communications device 14. The UI portion 98 is capable of rendering any information utilized in conjunction determining if non-voice emergency services are available as described herein. For example, the UI portion 98 can provide means for entering text, entering a phone number, rendering text, rendering images, rendering multimedia, rendering sound, rendering video, receiving sound, rendering an indication that NOVES are available, rendering an indication that NOVES are not available, or the like, as described herein. The UI portion 98 can provide the ability to control the communications device 14, via, for example, buttons, soft keys, voice actuated controls, a touch screen, movement of the mobile communications device 14, visual cues (e.g., moving a hand in front of a camera on the mobile communications device 14), or the like. The UI portion 98 can provide visual information (e.g., via a display), audio information (e.g., via speaker), mechanically (e.g., via a vibrating mechanism), or a combination thereof. In various configurations, the UI portion 98 can comprise a display, a touch screen, a keyboard, a speaker, or any combination thereof. The UI portion 98 can comprise means for inputting biometric information, such as, for example, fingerprint information, retinal information, voice information, and/or facial characteristic information. The UI portion 98 can be utilized to enter an indication of the designated destination (e.g., the phone number, IP address, or the like).

In an example embodiment, the sensor portion 100 of the communications device 14 comprises the video camera portion 102, the force/wave sensor 104, and the microphone 106. The video camera portion 102 comprises a camera (or cameras) and associated equipment capable of capturing still images and/or video and to provide the captured still images and/or video to other portions of the communications device 14. In an example embodiment, the force/wave sensor 104 comprises an accelerometer, a tilt sensor, an acoustic sensor capable of sensing acoustic energy, an optical sensor (e.g., infrared), or any combination thereof.

Figure 7:
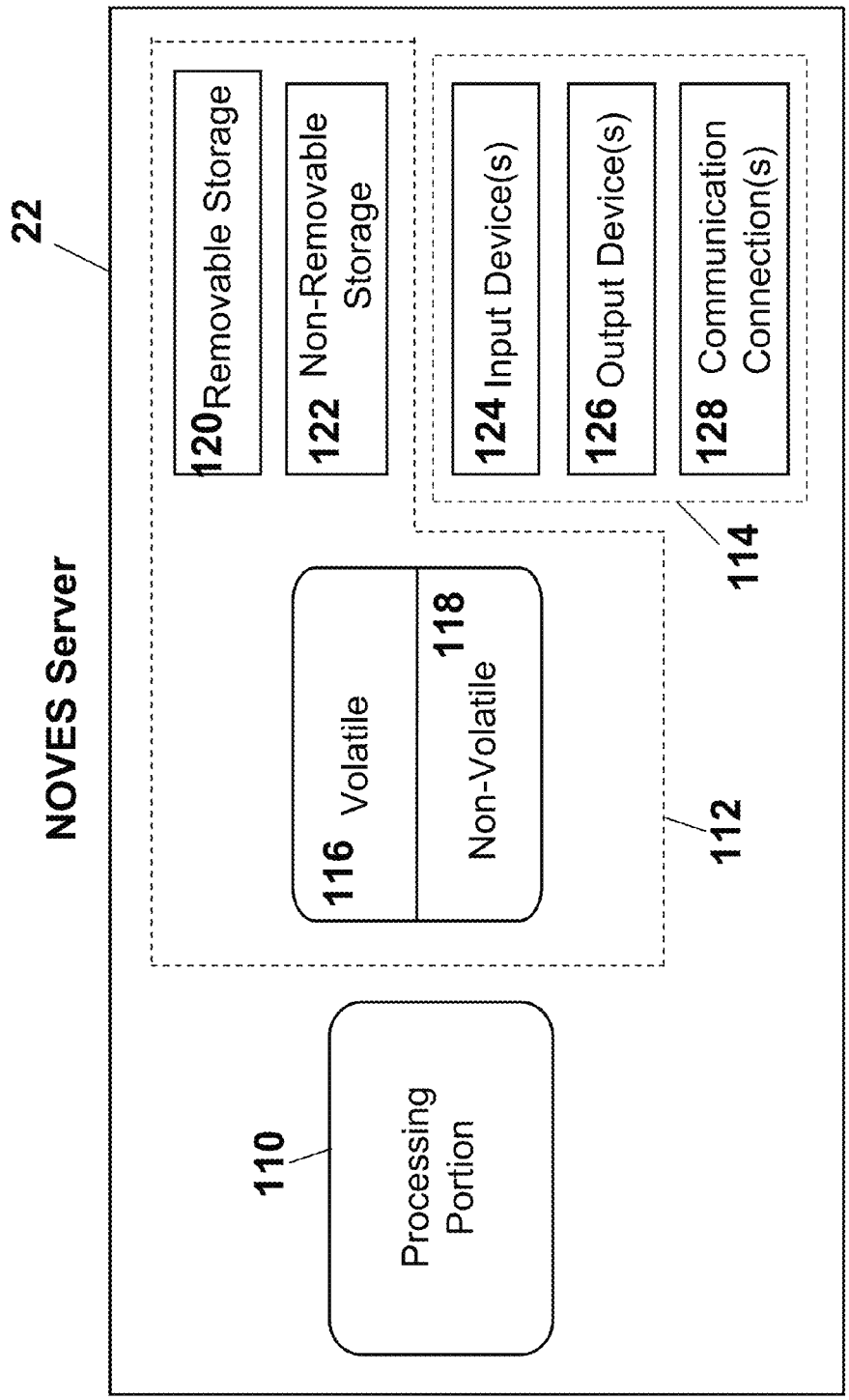
FIG. 7 is a block diagram of an example NOVES message server.

FIG. 7 is a block diagram of an example NOVES message server 22. In an example embodiment, the NOVES server 22 comprises a network entity comprising hardware, or a combination of hardware and software. And, each portion of the NOVES message server 22 comprises hardware, or a combination of hardware and software. When used in conjunction with a network, the functionality needed to facilitate determining if non-voice emergency services are available can reside in any one or combination of NOVES servers. The NOVES server 22 depicted in FIG. 7 represents any appropriate network entity, apparatus, or combination of network entities or apparatuses, such as a processor, a server, a gateway, etc., or any combination thereof. It is emphasized that the block diagram depicted in FIG. 7 is exemplary and not intended to imply a specific implementation or configuration. Thus, the NOVES server 22 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the NOVES server 22 comprises a processing portion 110, a memory portion 112, and an input/output portion 114. The processing portion 110, memory portion 112, and input/output portion 114 are coupled together (coupling not shown in FIG. 7) to allow communications therebetween. The input/output portion 114 is capable of receiving and/or providing information from/to a device (e.g., communications device 14) and/or other emergency message servers configured to be utilized when determining if non-voice emergency services are available. For example, the input/output portion 112 is capable of, in conjunction with any other portion of the NOVES server 22 as needed, receiving a query, providing an indication of NOVES availability, providing a query, providing a response to a query, receiving a response to a query, providing a message to a PSAP, receiving a message from a PSAP, providing a message (e.g., query) to a PSAP configuration database, receiving a message (e.g., query response) from a PSAP configuration database, providing a message (e.g., query) to a network configuration database, receiving a message (e.g., query response) from a network configuration database, or the like, or any combination thereof.

The processing portion 110 is capable of performing functions associated with the determining if non-voice emergency services are available, as described herein. For example, the processing portion 110 is capable of, in conjunction with any other portion of the NOVES server 22 as needed, processing a query, determining if a message (e.g., query) contains information pertaining to a cellular site from which a query was received, determining if a message (e.g., query) contains information pertaining to a location from which a query was provided, determining a region covered by a cellular site, identifying a PSAP assigned to handle a region from which a query was provided, identifying a PSAP assigned to handle a location from which a query was provided, generating a response to a message (e.g., query), or the like, or any combination thereof.

The memory portion 112 can store any information utilized in conjunction with determining if non-voice emergency services are available, as described herein. For example, the memory portion 112 is capable of storing information pertaining to a location of a communications device 14, a location of a NOVES server 22, a predetermined text message, a text message, a predetermined audio message, an audio message, subscriber profile information, subscriber identification information, phone numbers, an identification code of the communications device, video information, audio information, control information, information pertaining to a call taker handling a session, information pertaining to a PSAP handling a specific area or location, a cellular site covering a region from which a query was provided, a location from which a query was provided, a NOVES indicator, a region covered by a cell site that received a query, a PSAP assigned to handle a region, a PSAP assigned to handle a location, a query response, or the like, or a combination thereof. Depending upon the exact configuration and type of NOVES server 22, the memory portion 112 can include a computer storage medium, or media, that is volatile 116 (such as dynamic RAM), non-volatile 118 (such as ROM), or a combination thereof. The NOVES server 22 can include additional storage, in the form of computer storage media (e.g., removable storage 120 and/or non-removable storage 122) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The NOVES server 22 also can contain communications connection(s) 128 that allow the NOVES server 22 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The NOVES server 22 also can include input device(s) 124 such as keyboard, mouse, pen, voice input device, touch input device, an optical input device, etc. Output device(s) 126 such as a display, speakers, printer, mechanical vibrators, etc. also can be included.

The communications device (e.g., communications device 14) and the network entity (NOVES server 22) can be part of and/or in communication with various wireless communications networks. Some of which are described below.

Figure 8:
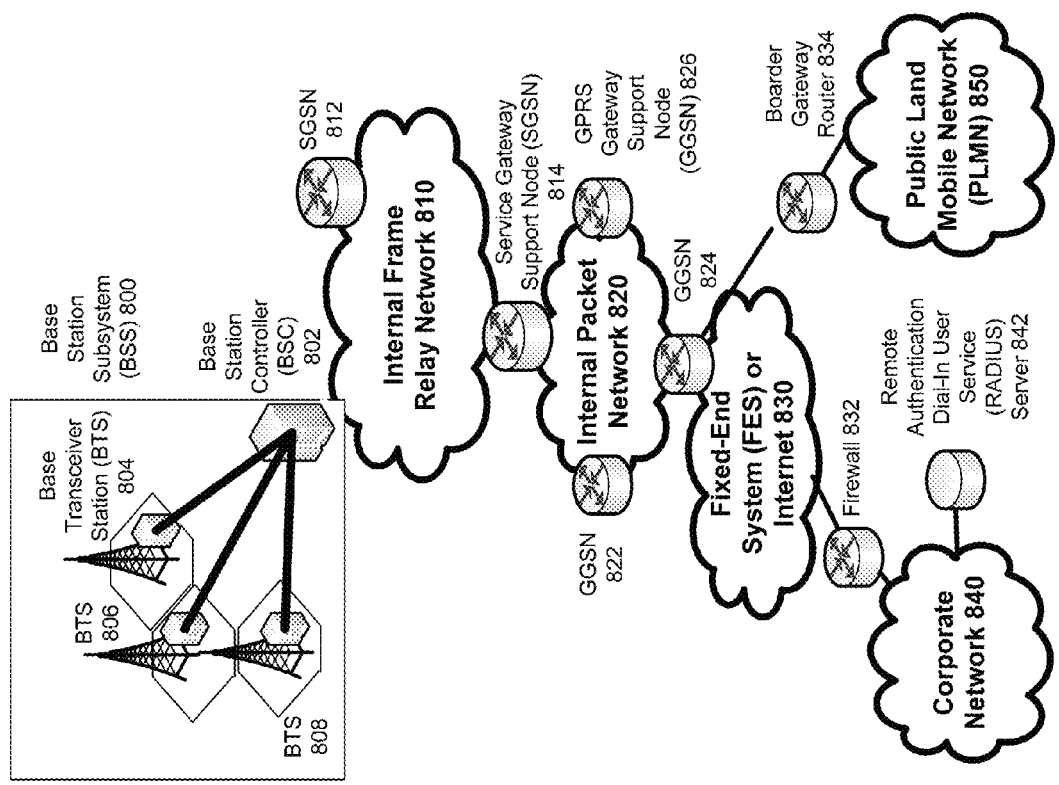
FIG. 8 depicts an overall block diagram of an exemplary packet-based mobile cellular network environment, such as a GPRS network, in which determining if non-voice emergency services are available can be implemented.

FIG. 8 depicts an overall block diagram of an exemplary packet-based mobile cellular network environment, such as a GPRS network, in which determining if non-voice emergency services are available can be implemented. In the exemplary packet-based mobile cellular network environment shown in FIG. 8, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 9:
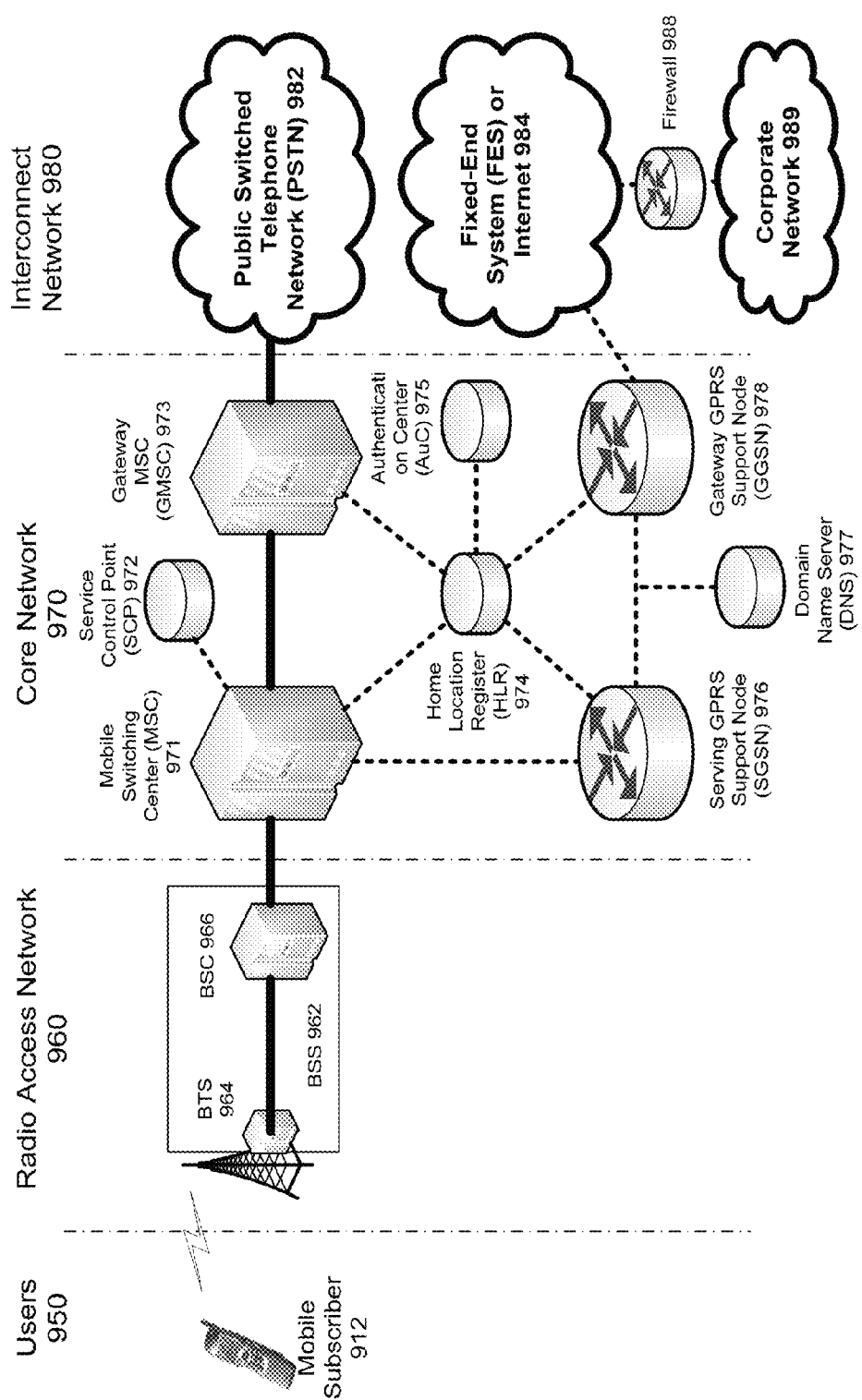
FIG. 9 illustrates an architecture of a typical GPRS network in which determining if non-voice emergency services are available can be implemented.

FIG. 9 illustrates an architecture of a typical GPRS network in which determining if non-voice emergency services are available can be implemented. The architecture depicted in FIG. 9 is segmented into four groups: users 950, radio access network 960, core network 970, and interconnect network 980. Users 950 comprise a plurality of end users. Note, device 912 is referred to as a mobile subscriber in the description of network shown in FIG. 9. In an example embodiment, the device depicted as mobile subscriber 912 comprises a communications device (e.g., wireless anti-theft security communications device 14). Radio access network 960 comprises a plurality of base station subsystems such as BSSs 962, which include BTSs 964 and BSCs 966. Core network 970 comprises a host of various network elements. As illustrated in FIG. 9, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 9, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 10:
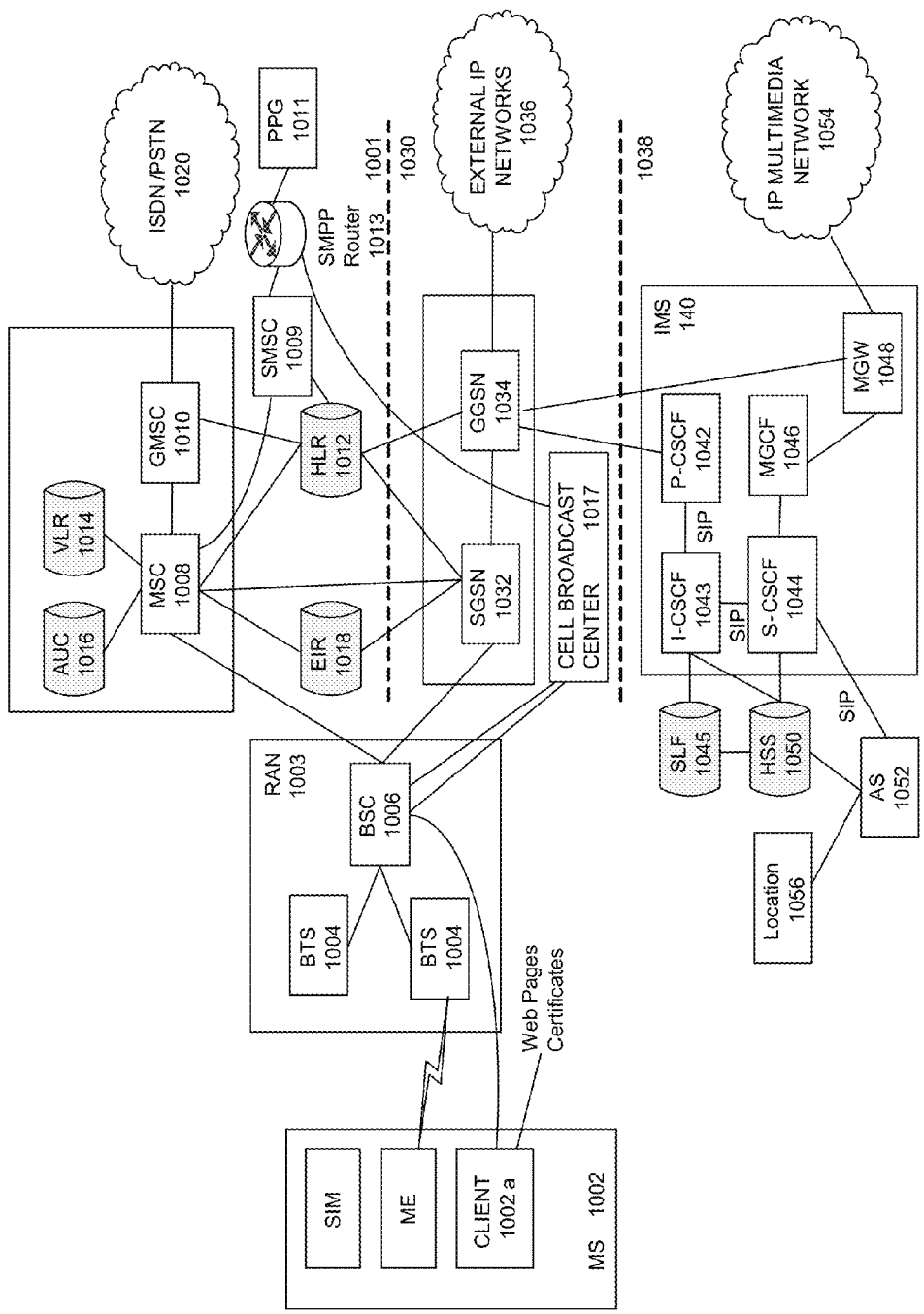
FIG. 10 illustrates an exemplary block diagram view of a GSM/GPRS/IP multimedia network architecture within which determining if non-voice emergency services are available can be implemented.

FIG. 10 illustrates an exemplary block diagram view of a GSM/GPRS/IP multimedia network architecture within which determining if non-voice emergency services are available can be implemented. As illustrated, the architecture of FIG. 10 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 1017 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 10, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 11:
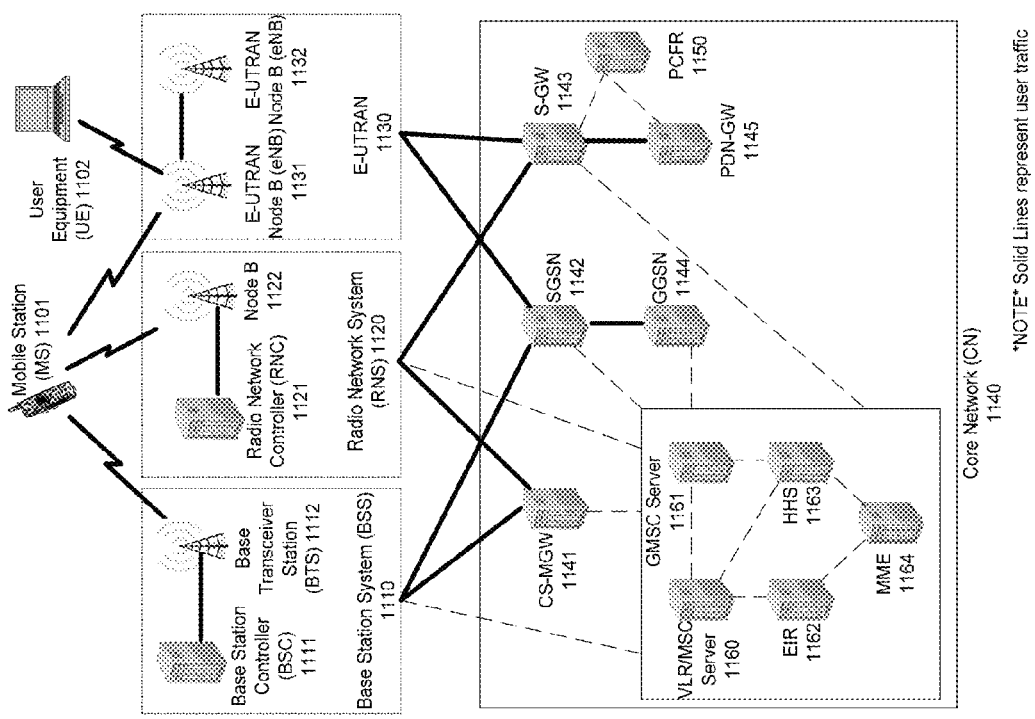
FIG. 11 illustrates a PLMN block diagram view of an exemplary architecture in which determining if non-voice emergency services are available may be incorporated.

FIG. 11 illustrates a PLMN block diagram view of an exemplary architecture in which determining if non-voice emergency services are available may be incorporated. Mobile Station (MS) 1101 is the physical equipment used by the PLMN subscriber. In one illustrative embodiment, communications device 40 may serve as Mobile Station 1101. Mobile Station 1101 may be one of, but not limited to, a cellular telephone, a cellular telephone in combination with another electronic device or any other wireless mobile communication device.

Mobile Station 1101 may communicate wirelessly with Base Station System (BSS) 1110. BSS 1110 contains a Base Station Controller (BSC) 1111 and a Base Transceiver Station (BTS) 1112. BSS 1110 may include a single BSC 1111/BTS 1112 pair (Base Station) or a system of BSC/BTS pairs which are part of a larger network. BSS 1110 is responsible for communicating with Mobile Station 1101 and may support one or more cells. BSS 1110 is responsible for handling cellular traffic and signaling between Mobile Station 1101 and Core Network 1140. Typically, BSS 1110 performs functions that include, but are not limited to, digital conversion of speech channels, allocation of channels to mobile devices, paging, and transmission/reception of cellular signals.

Additionally, Mobile Station 1101 may communicate wirelessly with Radio Network System (RNS) 1120. RNS 1120 contains a Radio Network Controller (RNC) 1121 and one or more Node(s) B 1122. RNS 1120 may support one or more cells. RNS 1120 may also include one or more RNC 1121/Node B 1122 pairs or alternatively a single RNC 1121 may manage multiple Nodes B 1122. RNS 1120 is responsible for communicating with Mobile Station 1101 in its geographically defined area. RNC 1121 is responsible for controlling the Node(s) B 1122 that are connected to it and is a control element in a UMTS radio access network. RNC 1121 performs functions such as, but not limited to, load control, packet scheduling, handover control, security functions, as well as controlling Mobile Station 1101's access to the Core Network (CN) 1140.

The evolved UMTS Terrestrial Radio Access Network (E-UTRAN) 1130 is a radio access network that provides wireless data communications for Mobile Station 1101 and User Equipment 1102. E-UTRAN 1130 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1130 may include of series of logical network components such as E-UTRAN Node B (eNB) 1131 and E-UTRAN Node B (eNB) 1132. E-UTRAN 1130 may contain one or more eNBs. User Equipment 1102 may be any user device capable of connecting to E-UTRAN 1130 including, but not limited to, a personal computer, laptop, mobile device, wireless router, or other device capable of wireless connectivity to E-UTRAN 1130. The improved performance of the E-UTRAN 1130 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 11 is the Enhanced Data rates for GSM Evolution (EDGE). EDGE is an enhancement for GPRS networks that implements an improved signal modulation scheme known as 11-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1101 may communicate with any or all of BSS 1110, RNS 1120, or E-UTRAN 1130. In a illustrative system, each of BSS 1110, RNS 1120, and E-UTRAN 1130 may provide Mobile Station 1101 with access to Core Network 1140. The Core Network 1140 may include of a series of devices that route data and communications between end users. Core Network 1140 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets.

Each packet may be routed, manipulated, processed or handled independently of all other packets in the PS domain and does not require dedicated network resources.

The Circuit Switched—Media Gateway Function (CS-MGW) 1141 is part of Core Network 1140, and interacts with Visitor Location Register (VLR) and Mobile-Services Switching Center (MSC) Server 1160 and Gateway MSC Server 1161 in order to facilitate Core Network 1140 resource control in the CS domain. Functions of CS-MGW 1141 include, but are not limited to, media conversion, bearer control, payload processing and other mobile network processing such as handover or anchoring. CS-MGW 1140 may receive connections to Mobile Station 1101 through BSS 1110, RNS 1120 or both.

Serving GPRS Support Node (SGSN) 1142 stores subscriber data regarding Mobile Station 1101 in order to facilitate network functionality. SGSN 1142 may store subscription information such as, but not limited to, the International Mobile Subscriber Identity (IMSI), temporary identities, or Packet Data Protocol (PDP) addresses. SGSN 1142 may also store location information such as, but not limited to, the Gateway GPRS Support Node (GGSN) 1144 address for each GGSN where an active PDP exists. GGSN 1144 may implement a location register function to store subscriber data it receives from SGSN 1142 such as subscription or location information.

Serving Gateway (S-GW) 1143 is an interface which provides connectivity between E-UTRAN 1130 and Core Network 1140. Functions of S-GW 1143 include, but are not limited to, packet routing, packet forwarding, transport level packet processing, event reporting to Policy and Charging Rules Function (PCRF) 1150, and mobility anchoring for inter-network mobility. PCRF 1150 uses information gathered from S-GW 1143, as well as other sources, to make applicable policy and charging decisions related to data flows, network resources and other network administration functions. Packet Data Network Gateway (PDN-GW) 1145 may provide user-to-services connectivity functionality including, but not limited to, network-wide mobility anchoring, bearer session anchoring and control, and IP address allocation for PS domain connections.

Home Subscriber Server (HSS) 1163 is a database for user information, and stores subscription data regarding Mobile Station 1101 or User Equipment 1102 for handling calls or data sessions. Networks may contain one HSS 1163 or more if additional resources are required. Exemplary data stored by HSS 1163 include, but is not limited to, user identification, numbering and addressing information, security information, or location information. HSS 1163 may also provide call or session establishment procedures in both the PS and CS domains.

The VLR/MSC Server 1160 provides user location functionality. When Mobile Station 1101 enters a new network location, it begins a registration procedure. A MSC Server for that location transfers the location information to the VLR for the area. A VLR and MSC Server may be located in the same computing environment, as is shown by VLR/MSC Server 1160, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1101 registration or procedures for handover of Mobile Station 1101 to a different section of the Core Network 1140. GMSC Server 1161 may serve as a connection to alternate GMSC Servers for other mobile stations in larger networks.

Equipment Identity Register (EIR) 1162 is a logical element which may store the International Mobile Equipment Identities (IMEI) for Mobile Station 1101. In a typical embodiment, user equipment may be classified as either "white listed" or "black listed" depending on its status in the network. In one embodiment, if Mobile Station 1101 is stolen and put to use by an unauthorized user, it may be registered as "black listed" in EIR 1162, preventing its use on the network. Mobility Management Entity (MME) 1164 is a control node which may track Mobile Station 1101 or User Equipment 1102 if the devices are idle. Additional functionality may include the ability of MME 1164 to contact an idle Mobile Station 1101 or User Equipment 1102 if retransmission of a previous session is required.

While example embodiments of determining if non-voice emergency services are available have been described in connection with various computing devices/processors, the underlying concepts can be applied to any computing device, processor, or system capable of determining if non-voice emergency services are available as described herein. The methods and apparatuses for determining if non-voice emergency services are available, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for determining if non-voice emergency services are available. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for determining if non-voice emergency services are available can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for determining if non-voice emergency services are available. When implemented on a general-purpose processor, the program code combines with the processor to provide a unique apparatus that operates to invoke the functionality of determining if non-voice emergency services are available.

While determining if non-voice emergency services are available has been described in connection with the various embodiments of the various figures, it is to be understood that other similar embodiments can be used or modifications and additions can be made to the described embodiments for determining if non-voice emergency services are available. For example, one skilled in the art will recognize that determining if non-voice emergency services are available as described in the present application may apply to any environment, whether wired or wireless, and may be applied to any number of devices connected via a communications network and interacting across the network. Therefore, determining if non-voice emergency services are available should not be limited to any single embodiment, but rather should be construed in breadth and scope in accordance with the appended claims.

What is claimed:

1. An apparatus comprising:
a processor; and
memory coupled to the processor, the memory comprising at least one executable instruction that when executed by the processor causes the processor to effectuate operations comprising:
receiving an indication as to whether non-voice emergency services are available;
analyzing the received indication to determine if non-voice emergency services are available;
upon a determination that non-voice emergency services are available, initiating a non-voice emergency message; and
upon a determination that non-voice emergency services are not available, providing at least one of:
a visual indication that non-voice emergency services are not available;
an audible indication that non-voice emergency services are not available; or
a mechanical indication that non-voice emergency services are not available.

2. The apparatus of claim 1, wherein the indication is received via a control channel.

3. The apparatus of claim 1, the operations further comprising:
providing an indication that non-voice emergency services are available.

4. The apparatus of claim 1, the operations further comprising:
providing at least one of:
a visual indication that non-voice emergency services are available;
an audible indication that non-voice emergency services are available; or
a mechanical indication that non-voice emergency services are available.

5. A method comprising:
receiving an indication as to whether non-voice emergency services are available;
analyzing the received indication to determine if non-voice emergency services are available;
upon a determination that non-voice emergency services are available, initiating a non-voice emergency message; and
upon a determination that non-voice emergency services are not available, providing at least one of:
a visual indication that non-voice emergency services are not available;
an audible indication that non-voice emergency services are not available; or
a mechanical indication that non-voice emergency services are not available.

6. The method of claim 5, wherein the indication of as to whether non-voice emergency services are available is received via a control channel.

7. The method of claim 5, further comprising:
providing an indication that non-voice emergency services are available.

8. The method of claim 5, further comprising:
providing at least one of:
a visual indication that non-voice emergency services are available;
an audible indication that non-voice emergency services are available; or
a mechanical indication that non-voice emergency services are available.

9. A computer-readable storage medium comprising at least one executable instruction that when executed by a processor cause the processor to effectuate operation comprising:
receiving an indication as to whether non-voice emergency services are available;
analyzing the received indication to determine if non-voice emergency services are available;
upon a determination that non-voice emergency services are available, initiating a non-voice emergency message; and
upon a determination that non-voice emergency services are not available, providing at least one of:
a visual indication that non-voice emergency services are not available;
an audible indication that non-voice emergency services are not available; or
a mechanical indication that non-voice emergency services are not available.

10. The computer-readable storage medium of claim 9, wherein the indication is received via a control channel.

11. The computer-readable storage medium of claim 9, the operations further comprising:
providing an indication that non-voice emergency services are available.

12. The computer-readable storage medium of claim 9, the operations further comprising:
providing at least one of:
a visual indication that non-voice emergency services are available;
an audible indication that non-voice emergency services are available; or
a mechanical indication that non-voice emergency services are available.

* * * * *